US012305630B2

(12) United States Patent
Ikeda et al.

(10) Patent No.: US 12,305,630 B2
(45) Date of Patent: May 20, 2025

(54) ATOMIZER

(71) Applicant: Murata Manufacturing Co., Ltd., Kyoto (JP)

(72) Inventors: Miki Ikeda, Kyoto (JP); Yohei Kawasaki, Kyoto (JP); Kiyoshi Kurihara, Kyoto (JP); Kenjiro Okaguchi, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 925 days.

(21) Appl. No.: 17/469,360

(22) Filed: Sep. 8, 2021

(65) Prior Publication Data

US 2021/0404460 A1 Dec. 30, 2021

Related U.S. Application Data

(63) Continuation of application No. PCT/JP2020/010353, filed on Mar. 10, 2020.

(30) Foreign Application Priority Data

Mar. 29, 2019 (JP) ................................ 2019-067852

(51) Int. Cl.
*F04B 43/04* (2006.01)
*B05B 7/24* (2006.01)
(Continued)

(52) U.S. Cl.
CPC .......... *F04B 43/046* (2013.01); *B05B 7/2416* (2013.01); *B05B 17/0607* (2013.01); *H05B 1/0244* (2013.01)

(58) Field of Classification Search
CPC ... F04B 43/046; H05B 1/0244; B05B 7/0012; B05B 7/2416; B05B 7/2429; B05B 7/2437; B05B 17/06; B05B 17/0607
(Continued)

(56) References Cited

U.S. PATENT DOCUMENTS

RE38,281 E * 10/2003 Tisone ................ B05B 17/0607 239/369
2006/0091160 A1 5/2006 Sweeton
(Continued)

FOREIGN PATENT DOCUMENTS

JP 2005-030213 A 2/2005
JP 2008-518779 A 6/2008
(Continued)

OTHER PUBLICATIONS

International Search Report for International Patent Application No. PCT/JP2020/010353 dated Jun. 9, 2020.
(Continued)

*Primary Examiner* — Steven J Ganey
(74) *Attorney, Agent, or Firm* — McDonald Hopkins LLC

(57) ABSTRACT

An atomizer includes a first piezoelectric pump, a second piezoelectric pump, a first flow path connected to the first piezoelectric pump, a second flow path connected to the second piezoelectric pump and merged with the first flow path, a third flow path connected to a merging portion of the first flow path and the second flow path, the third flow path having a first end and a second end, a liquid storage portion, and a nozzle including a gas supply flow path connected to the second end of the third flow path, a liquid supply flow path connected to the liquid storage portion, and a blow-out port, wherein the third flow path has a bent portion between the first end and the second end.

20 Claims, 14 Drawing Sheets

(51) Int. Cl.
*B05B 17/06* (2006.01)
*H05B 1/02* (2006.01)

(58) Field of Classification Search
USPC ..... 239/4, 102.1, 102.2, 337, 340, 351, 369; 128/200.16
See application file for complete search history.

(56) References Cited

U.S. PATENT DOCUMENTS

| | | | | |
|---|---|---|---|---|
| 2017/0112975 | A1 | 4/2017 | Fujisaki | |
| 2021/0347554 | A1* | 11/2021 | Lee | B05B 7/2424 |
| 2022/0001404 | A1* | 1/2022 | Song | A61L 9/03 |

FOREIGN PATENT DOCUMENTS

| | | | |
|---|---|---|---|
| JP | 2008-247405 | A | 10/2008 |
| JP | 2014-000517 | A | 1/2014 |
| WO | 2016/006458 | A1 | 1/2016 |

OTHER PUBLICATIONS

Written Opinion for International Patent Application No. PCT/JP2020/010353 dated Jun. 9, 2020.

* cited by examiner

ATOMIZER

CROSS REFERENCE TO RELATED APPLICATIONS

This is a continuation of International Application No. PCT/JP2020/010353 filed on Mar. 10, 2020 which claims priority from Japanese Patent Application No. 2019-067852 filed on Mar. 29, 2019. The contents of these applications are incorporated herein by reference in their entireties.

BACKGROUND

Technical Field

The present disclosure relates to an atomizer configured to mix liquid and gas to atomize the mixture.

In general, an atomizer configured to mix liquid and gas to atomize the mixture has been disclosed (for example, refer to Patent Document 1).

The atomizer disclosed in Patent Document 1 includes an injection cylinder configured to inject air as gas and a liquid storage container configured to store liquid. The injection cylinder is connected to the liquid storage container and can manually inject air by a user. A narrowed portion having a reduced sectional area is provided at a connection portion of the injection cylinder and the liquid storage container. When air is injected from the injection cylinder, negative pressure is generated when the air passes through the narrowed portion, and a Venturi effect is generated. The liquid in the liquid storage container is sucked due to the Venturi effect, mixed with air, and atomized. The atomized liquid is blown out from a blow-out port provided in the atomizer.

Patent Document 1: Japanese Unexamined Patent Application Publication No. 2008-247405

BRIEF SUMMARY

In recent years, there has been a demand for increasing a flow rate per unit time blown out from the atomizer. In addition, in the configuration disclosed in Patent Document 1, liquid supplied from the liquid storage container may flow back to the injection cylinder serving as a gas supply source, and the injection cylinder may malfunction. It can be said that there is still room for improvement regarding preventing the liquid from flowing back to the gas supply source, along with increasing the flow rate per unit time blown out from the atomizer.

Thus, the present disclosure provides an atomizer configured to prevent liquid from flowing back to a gas supply source, along with being configured to increase a flow rate per unit time blown out from the atomizer.

An atomizer according to an aspect of the present disclosure including a first piezoelectric pump configured to blow out gas from a first discharge port, a second piezoelectric pump configured to blow out gas from a second discharge port, a first flow path connected to the first discharge port of the first piezoelectric pump, a second flow path connected to the second discharge port of the second piezoelectric pump and merged with the first flow path, a third flow path connected to a merging portion of the first flow path and the second flow path, the third flow path having a first end and a second end, a liquid storage portion configured to store liquid, and a nozzle including a gas supply flow path connected to the second end of the third flow path, a liquid supply flow path connected to the liquid storage portion, and a blow-out port, the nozzle that causes the gas supply flow path and the liquid supply flow path to be merged to connect the merged gas supply flow path and liquid supply flow path to the blow-out port, wherein the third flow path has a bent portion between the first end and the second end.

According to the atomizer of the present disclosure, it is possible to prevent liquid from flowing back to the gas supply source, along with increasing a flow rate per unit time blown out from the atomizer.

DETAILED DESCRIPTION

Figure 1:
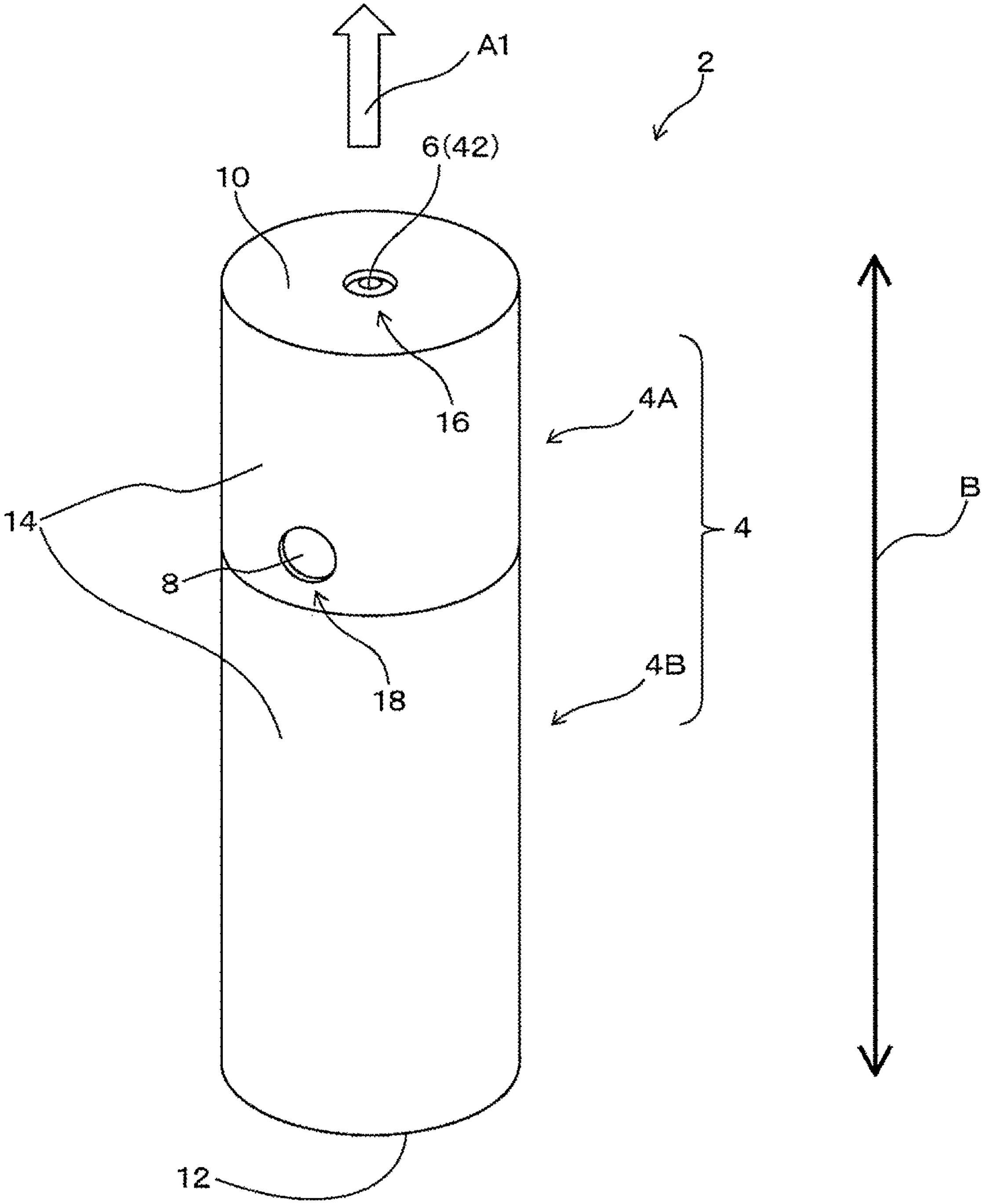
FIG. 1 is a perspective view of an atomizer according to an embodiment.

According to a first aspect of the present disclosure, there is provided an atomizer including a first piezoelectric pump configured to blow out gas from a first discharge port, a second piezoelectric pump configured to blow out gas from a second discharge port, a first flow path connected to the first discharge port of the first piezoelectric pump, a second flow path connected to the second discharge port of the second piezoelectric pump and merged with the first flow path, a third flow path connected to a merging portion of the first flow path and the second flow path, the third flow path having a first end and a second end, a liquid storage portion configured to store liquid, and a nozzle including a gas supply flow path connected to the second end of the third flow path, a liquid supply flow path connected to the liquid storage portion, and a blow-out port, the blow-out port connected to the gas supply flow path and the liquid supply flow path in such a manner that gas supplied to the gas supply flow path and liquid supplied to the liquid supply flow path are merged to supply the merged gas and liquid to the blow-out port, wherein the third flow path has a bent portion between the first end and the second end.

According to such a configuration, by blowing out gas by using at least two piezoelectric pumps, a flow rate per unit time blown out from the atomizer can be increased. Further, since the third flow path has a bent shape, even when liquid supplied to the nozzle flows back to the third flow path, the liquid can be captured in the third flow path before reaching the first flow path or the second flow path. This can prevent the liquid from flowing back to the piezoelectric pumps.

According to a second aspect of the present disclosure, there is provided the atomizer according to the first aspect, wherein the bent portion is bent toward a side opposite to a side where the blow-out port is positioned with respect to the merging portion. According to such a configuration, even when liquid supplied to the nozzle flows back to the third flow path, the liquid can be more reliably captured in the third flow path before reaching the first flow path or the second flow path.

According to a third aspect of the present disclosure, there is provided the atomizer according to the first aspect or the second aspect, wherein the third flow path includes a first portion extending from the first end, a second portion being curved and extending from the first portion as the bent portion, and a third portion extending from the second portion to the second end. According to such a configuration, even when liquid supplied to the nozzle flows back to the third flow path, the liquid can be more reliably captured in the third flow path before reaching the first flow path or the second flow path.

According to a fourth aspect of the present disclosure, there is provided the atomizer according to any one of the first to third aspects, wherein the first piezoelectric pump has a first main surface forming the first discharge port and a second main surface opposite to the first main surface, the second piezoelectric pump has a third main surface forming the second discharge port and a fourth main surface opposite to the third main surface, and the second main surface and the fourth main surface are arranged to face each other. According to such a configuration, it is possible to provide a space in which a member is arranged between the second main surface and the fourth main surface, and efficient arrangement can be achieved.

According to a fifth aspect of the present disclosure, there is provided the atomizer according to the fourth aspect, wherein the nozzle is arranged in a space between the second main surface and the fourth main surface. According to such a configuration, efficient arrangement can be achieved, and the atomizer can be miniaturized.

According to a sixth aspect of the present disclosure, there is provided the atomizer according to any one of the first to fifth aspects, wherein a joint portion having a first port, a second port, and a third port respectively connected to the first flow path, the second flow path, and the third flow path, and forming a flow path inside the joint portion is provided at the merging portion of the first flow path and the second flow path. According to such a configuration, the plurality of flow paths can be easily connected by providing the joint portion.

According to a seventh aspect of the present disclosure, there is provided the atomizer according to the sixth aspect, wherein the joint portion is a T-tube or a Y-tube. According to such a configuration, a joint portion having versatility can be used, and manufacturing cost of the atomizer can be reduced.

According to an eighth aspect of the present disclosure, there is provided the atomizer according to any one of the first to seventh aspects, further including a case configured to accommodate the first piezoelectric pump, the second piezoelectric pump, the first flow path, the second flow path, the third flow path, and the nozzle, the case formed with a first opening through which the blow-out port of the nozzle is exposed to an outside. According to such a configuration, internal components of the atomizer can be protected by the case.

According to a ninth aspect of the present disclosure, there is provided the atomizer according to the eighth aspect, further including a switch electrically connected to the first piezoelectric pump and the second piezoelectric pump, wherein the case accommodates the switch and is formed with a second opening through which the switch is exposed to an outside. According to such a configuration, the piezoelectric pumps can be easily driven by providing the switch.

According to a tenth aspect of the present disclosure, there is provided the atomizer according to the eighth aspect, wherein the case has an upper surface, a lower surface, and a side surface connecting the upper surface and the lower surface, and the first opening is formed in the upper surface. According to such a configuration, the blow-out port of the nozzle can be exposed from the upper surface of the case, and positioning of the blow-out port of the nozzle can be easily performed.

According to an eleventh aspect of the present disclosure, there is provided the atomizer according to the ninth aspects, wherein the case has an upper surface, a lower surface, and a side surface connecting the upper surface and the lower surface, the first opening is formed in the upper surface, and the second opening is formed in the side surface. According to such a configuration, when a user holds the case and presses the switch, it is easy to position the blow-out port of the nozzle at a desired position.

According to a twelfth aspect of the present disclosure, there is provided the atomizer according to the eleventh aspect, wherein the second opening is arranged at a position closer to the upper surface than to the lower surface in the side surface of the case. According to this configuration, when the user holds the case and operates the atomizer, the user can easily press the switch while positioning the blow-out port of the nozzle.

According to a thirteenth aspect of the present disclosure, there is provided the atomizer according to any one of the eighth to twelfth aspects, wherein the case has a cylindrical shape. According to such a configuration, the user can easily hold the atomizer, and the operability of the atomizer can be improved.

According to a fourteenth aspect of the present disclosure, there is provided the atomizer according to any one of the first to thirteenth aspects, wherein the liquid storage portion includes a vent. According to such a configuration, it is possible to set the inside of the liquid storage portion to the atmospheric pressure, and stable and continuous atomization can be performed.

Embodiment

Hereinafter, an embodiment of the present disclosure will be described in detail with reference to the accompanying drawings.

Figure 2:
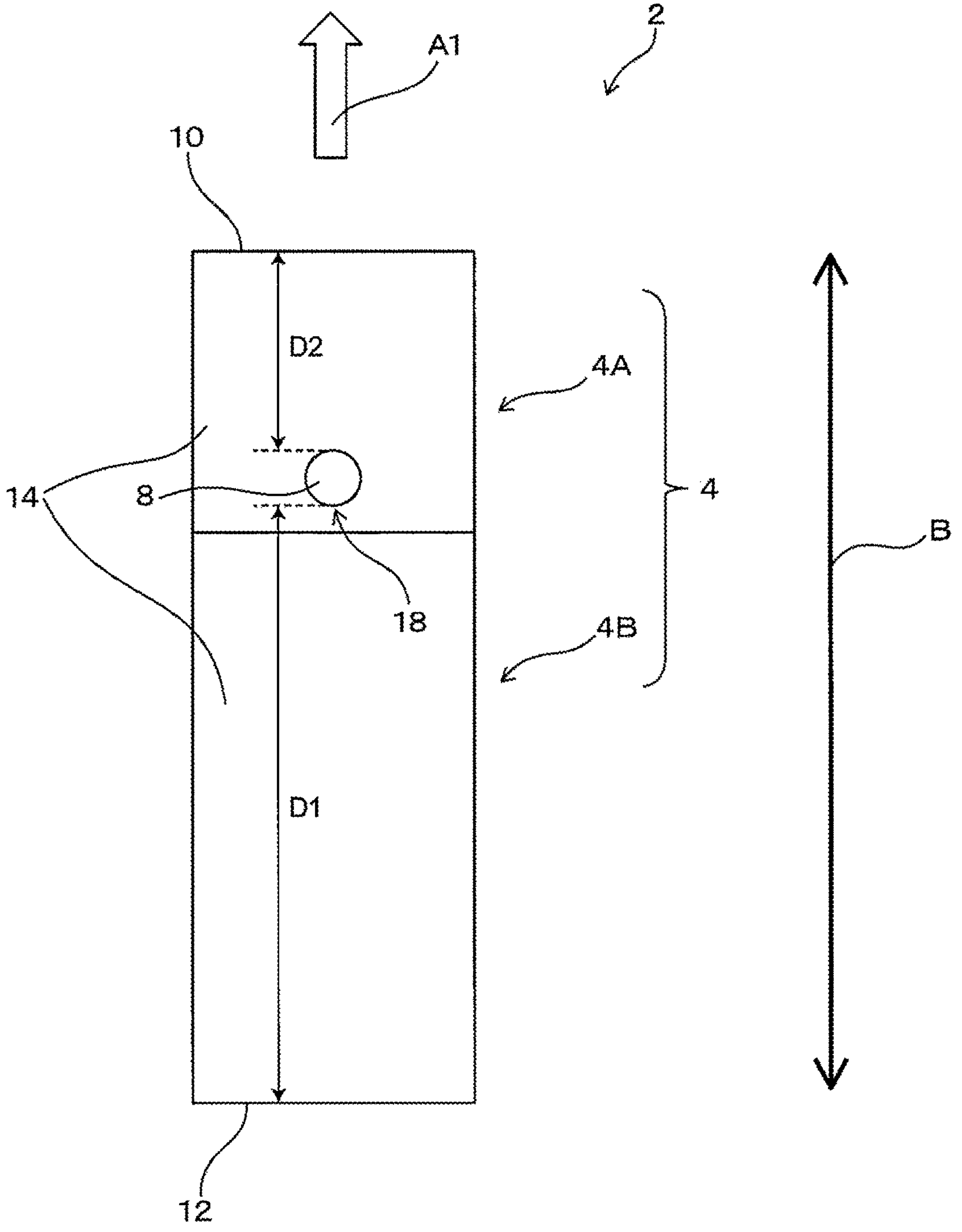
FIG. 2 is a side view of the atomizer according to the embodiment.
Figure 3:
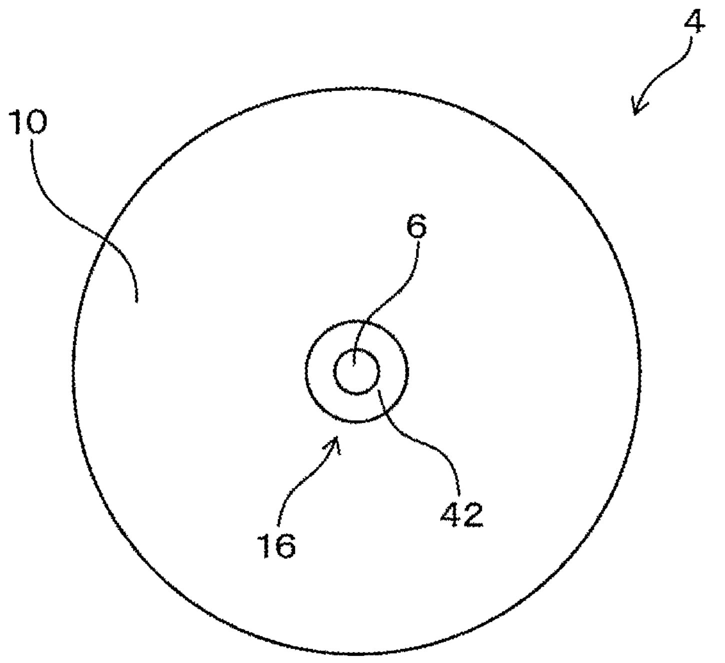
FIG. 3 is a top view of the atomizer according to the embodiment.
Figure 4:
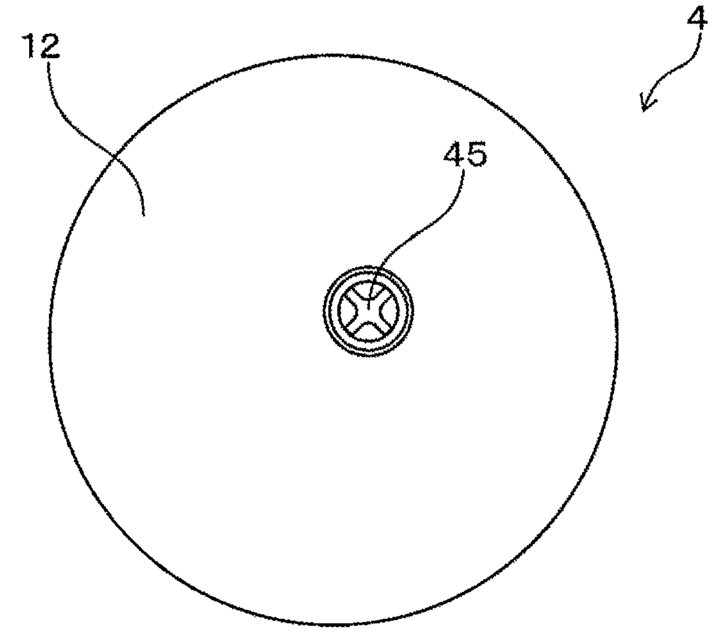
FIG. 4 is a bottom view of the atomizer according to the embodiment.

FIG. 1 to FIG. 4 are views illustrating an atomizer 2 according to the embodiment of the present disclosure. FIG. 1 is a perspective view of the atomizer 2, and FIG. 2 is a side view of the atomizer 2. FIG. 3 is a top view of the atomizer 2, and FIG. 4 is a bottom view of the atomizer 2.

The atomizer 2 is a device that mixes liquid and gas and atomizes the mixture. The atomizer 2 illustrated in FIG. 1 and FIG. 2 includes a case 4, a blow-out port 6, and a switch 8. The atomizer 2 is used, for example, as a medical nebulizer. The liquid is, for example, physiological saline, an organic solvent (ethanol or the like), or a drug (steroid, β2 stimulator or the like). The gas is, for example, air. When the user presses the switch 8, the atomized liquid is blown out upward from the blow-out port 6 (see an arrow A1). As illustrated in FIG. 1 and FIG. 2, a vertical direction of the atomizer 2 is defined as a direction B.

The case 4 is a member that accommodates the internal components of the atomizer 2 and configures an outer frame of the atomizer 2. The case 4 has an upper surface 10, a lower surface 12, and a side surface 14. The case 4 of the present embodiment has a cylindrical shape. By forming the case 4 in a cylindrical shape, the user can easily hold the atomizer 2, and the operability of the atomizer 2 can be improved.

The blow-out port 6 is exposed on the upper surface 10 of the case 4. The blow-out port 6 is an opening through which the atomized liquid is blown out toward an A1 direction. The blow-out port 6 is arranged in an upper surface of a nozzle 42 that will be described later.

The switch 8 is exposed on the side surface 14 of the case 4. The switch 8 is a switching member configured to switch ON/OFF of the operation of the atomizer 2.

As illustrated in FIG. 4, a screw 45 is exposed on the lower surface 12 of the case 4. The screw 45 is a member that fixes a housing 19 that will be described later to the case 4.

Referring back to FIG. 1 and FIG. 2, the case 4 includes a first case portion 4A and a second case portion 4B. The first case portion 4A is an upper portion of the case 4, and the second case portion 4B is a lower portion of the case 4.

The upper surface 10 of the first case portion 4A is formed with a first opening 16, and the side surface 14 thereof is formed with a second opening 18. The first opening 16 is an opening through which the blow-out port 6 is exposed, and the second opening 18 is an opening through which the switch 8 is exposed.

In particular, the second opening 18 is arranged at a position closer to the upper surface 10 than to the lower surface 12. Specifically, as illustrated in FIG. 2, a height D1 from the second opening 18 to the lower surface 12 is set to be longer than a height D2 from the second opening 18 to the upper surface 10. Thus, a height position of the switch 8 is arranged on an upper side from the center position in a height direction of the atomizer 2. According to such an arrangement, when the user holds the case 4 and presses the switch 8 of the atomizer 2, it becomes easy to position the blow-out port 6 at a desired position (for example, the nose of the user).

Figure 5:
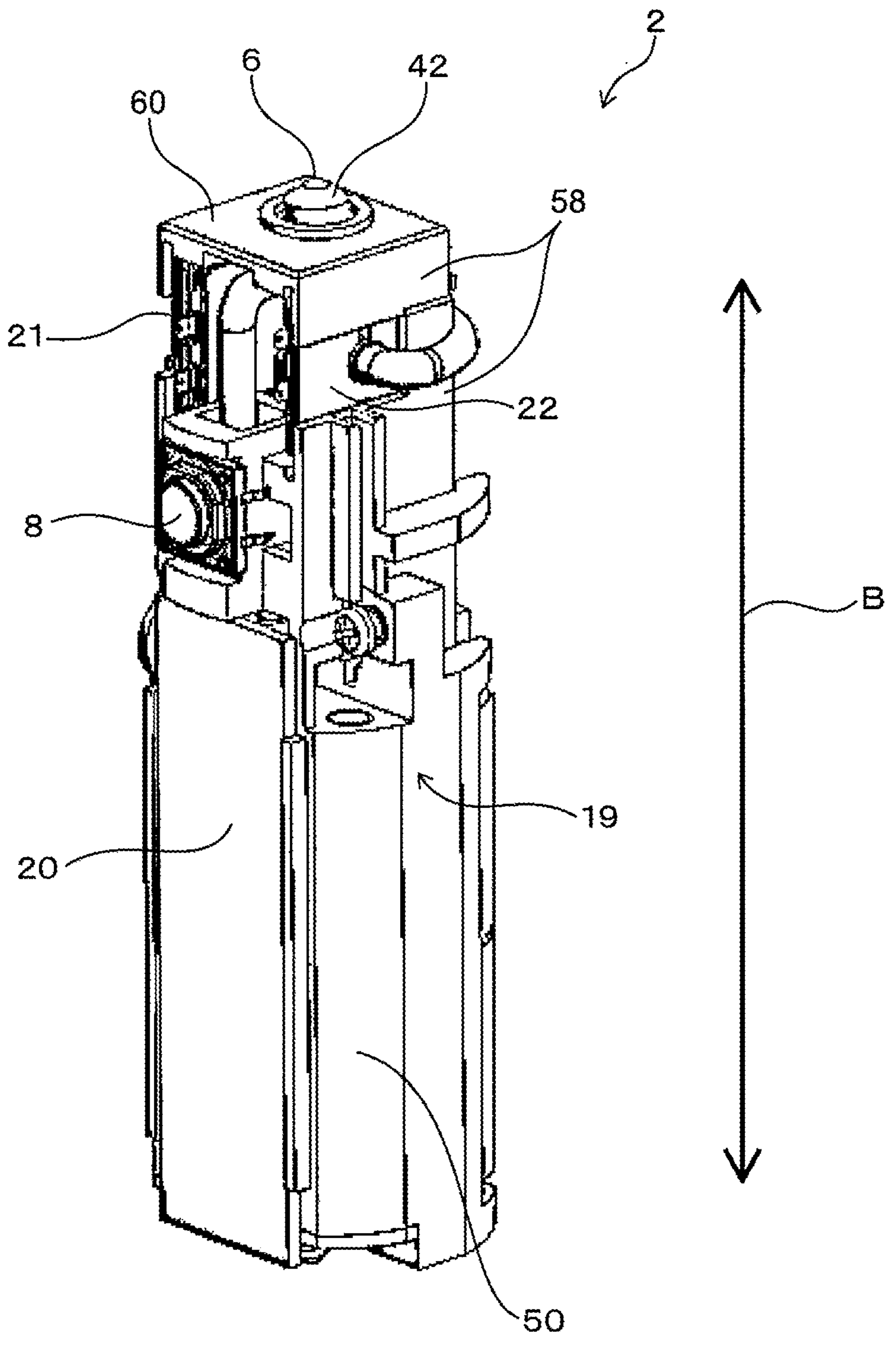
FIG. 5 is a perspective view on a front side of the atomizer with a case removed, according to the embodiment.
Figure 6:
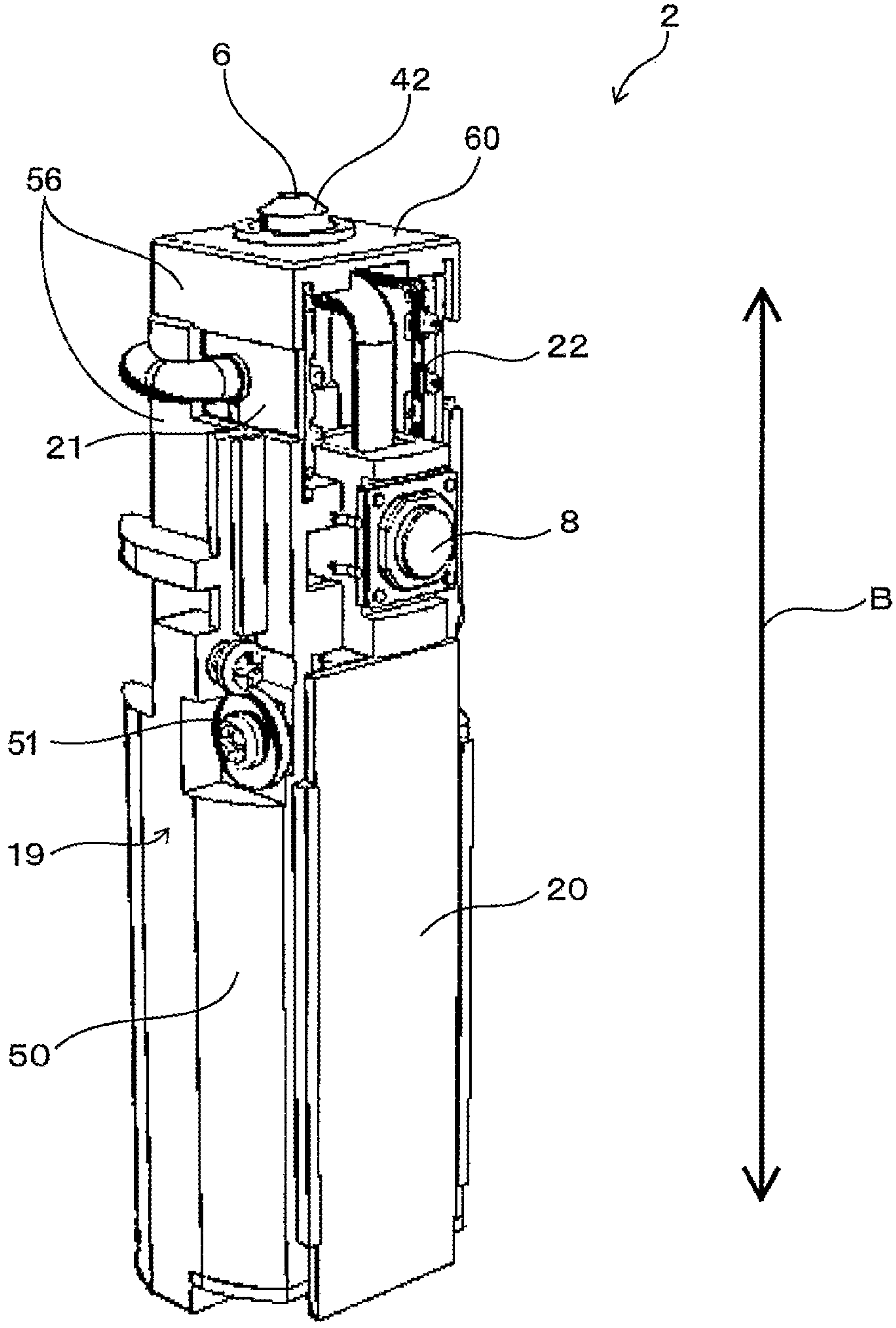
FIG. 6 is a perspective view on a front side of the atomizer with the case removed, according to the embodiment.

FIG. 5 and FIG. 6 illustrate a state in which the case 4 is removed from the atomizer 2. FIG. 5 and FIG. 6 are perspective views on a front side of the atomizer 2 with the case 4 removed. As illustrated in FIG. 5 and FIG. 6, the atomizer 2 includes the housing 19, a control board 20, a first piezoelectric pump 21, and a second piezoelectric pump 22.

The housing 19 is a member that holds internal components, such as the control board 20, the first piezoelectric pump 21, and the second piezoelectric pump 22. The housing 19 is accommodated in the case 4 in a state of holding the internal components of the atomizer 2.

The housing 19 has a liquid storage portion 50 configured to store liquid and a water supply hole 51 (FIG. 6) at a position adjacent to the control board 20. The liquid storage portion 50 is a portion that forms a space capable of storing liquid therein. The water supply hole 51 is a hole that can be opened and closed so as to supply liquid to the storage space of the liquid storage portion 50.

The control board 20 is a member configured to drive the first piezoelectric pump 21 and the second piezoelectric pump 22. The control board 20 is electrically connected to the first piezoelectric pump 21 and the second piezoelectric pump 22, and is also electrically connected to the switch 8. When the switch 8 is pressed, a signal flows from the switch 8 to the control board 20. In response to this signal, a drive voltage is applied from the control board 20 to the first piezoelectric pump 21 and the second piezoelectric pump 22, and the first piezoelectric pump 21 and the second piezoelectric pump 22 are driven.

Each of the first piezoelectric pump 21 and the second piezoelectric pump 22 is a gas supply source configured to supply gas to a nozzle 42 that will be described later, and is a piezoelectric pump using a piezoelectric element (may be referred to as a “microblower”, a “micropump”, or the like). Specifically, the piezoelectric pump has a structure in which a piezoelectric element (not illustrated) is bonded to a metal plate (not illustrated), and by supplying AC power to the piezoelectric element and the metal plate, unimorph mode bending deformation is generated to transport gas. In such a piezoelectric pump, a diaphragm (not illustrated) having a valve function for limiting the flow of gas only in one direction is incorporated. In the present embodiment, piezoelectric pumps having the same specifications and output are used for the first piezoelectric pump 21 and the second piezoelectric pump 22.

Figure 7:
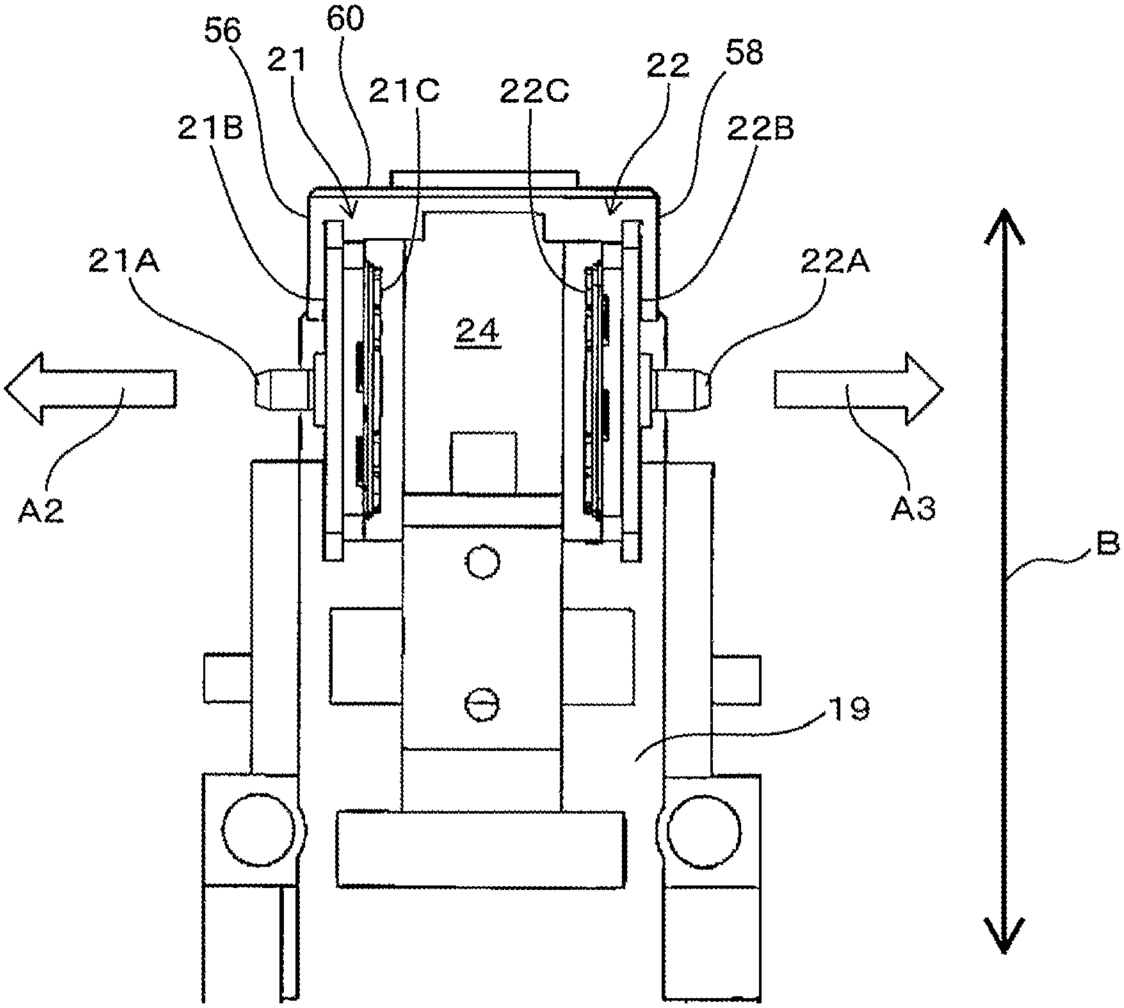
FIG. 7 is an enlarged view of the periphery of a piezoelectric pump, according to the embodiment.

The configuration and arrangement of the first piezoelectric pump 21 and the second piezoelectric pump 22 will be described with reference to FIG. 7. FIG. 7 is an enlarged view of the periphery of the first piezoelectric pump 21 and the second piezoelectric pump 22. As illustrated in FIG. 7, the first piezoelectric pump 21 has a first discharge port 21A configured to blow out gas. The gas is blown out from the first discharge port 21A toward an A2 direction. Similarly, the second piezoelectric pump 22 has a second discharge port 22A configured to blow out gas. The gas is blown out from the second discharge port 22A toward an A3 direction. The A2 direction and the A3 direction in the present embodiment are directions opposite to each other by 180 degrees.

The first piezoelectric pump 21 further has a first main surface 21B and a second main surface 21C. The first main surface 21B is a surface on a side from which the first discharge port 21A is caused to protrude, and the second main surface 21C is a surface on the opposite side to the first main surface 21B. Both the first main surface 21B and the second main surface 21C are surfaces extending orthogonal to the A2 direction. Similarly, the second piezoelectric pump 22 further has a third main surface 22B and a fourth main surface 22C. The third main surface 22B is a surface on a side from which the second discharge port 22A is caused to protrude, and the fourth main surface 22C is a surface on the opposite side to the third main surface 22B. Both the third main surface 22B and the fourth main surface 22C are surfaces extending orthogonal to the A3 direction.

In the present embodiment, both the first piezoelectric pump 21 and the second piezoelectric pump 22 are arranged in a “vertical arrangement”. That is, all of the first main surface 21B, the second main surface 21C, the third main surface 22B, and the fourth main surface 22C are arranged so as to extend along the B direction that is a vertical direction of the atomizer 2. According to such an arrangement, a dimension of the atomizer 2 in a horizontal direction can be reduced as compared with a case where the first piezoelectric pump 21 and the second piezoelectric pump 22 are arranged at the same height position in a so-called “horizontal arrangement”. Thus, the atomizer 2 can be formed into a vertically long shape, and when a user holds the case 4 and presses the switch 8 of the atomizer 2, the blow-out port 6 can be easily positioned at a desired position.

Further, in the present embodiment, the second main surface 21C and the fourth main surface 22C are arranged so as to face each other. The second main surface 21C and the fourth main surface 22C are spaced apart from each other, and a space 24 is formed therebetween. The space 24 is an “opposing space” in which the second main surface 21C and the fourth main surface 22C face each other. An air suction hole (not illustrated) is formed in each of the second main surface 21C and the fourth main surface 22C, and can suck air of the space 24. By providing such a space 24, another member can be arranged in the space 24. Although not illustrated in FIG. 7, the nozzle 42 that will be described later is arranged in the space 24.

On the other hand, the first main surface 21B and the third main surface 22B are arranged so as to face in directions away from each other (that is, the A2 direction and the A3 direction). The first main surface 21B and the third main surface 22B are arranged in a so-called “outward” manner. It is possible to prevent interference between flow paths 26 and 28 connected to the piezoelectric pumps 21 and 22, as compared with a case where the first main surface 21B and the third main surface 22B are arranged to face each other, that is, arranged in a so-called “inward” manner. This allows the flow paths 26 and 28 to be curved more gently.

Returning to FIG. 6, the first piezoelectric pump 21 is held by a side wall portion 56 of the housing 19. That is, the first main surface 21B of the first piezoelectric pump 21 is held by the side wall portion 56. Returning to FIG. 5, the second piezoelectric pump 22 is held by the side wall portion 58 of the housing 19. That is, the third main surface 22B of the second piezoelectric pump 22 is held by the side wall portion 58. The side wall portions 56 and 58 are connected by an upper wall portion 60 of the housing 19. The upper wall portion 60 is a portion that causes the nozzle 42 to protrude upward.

By holding the piezoelectric pumps 21 and 22 by the side wall portions 56 and 58, resonance sound during driving of the piezoelectric pumps 21 and 22 can be suppressed, and vibration of the entire atomizer 2 can be suppressed.

Figure 8:
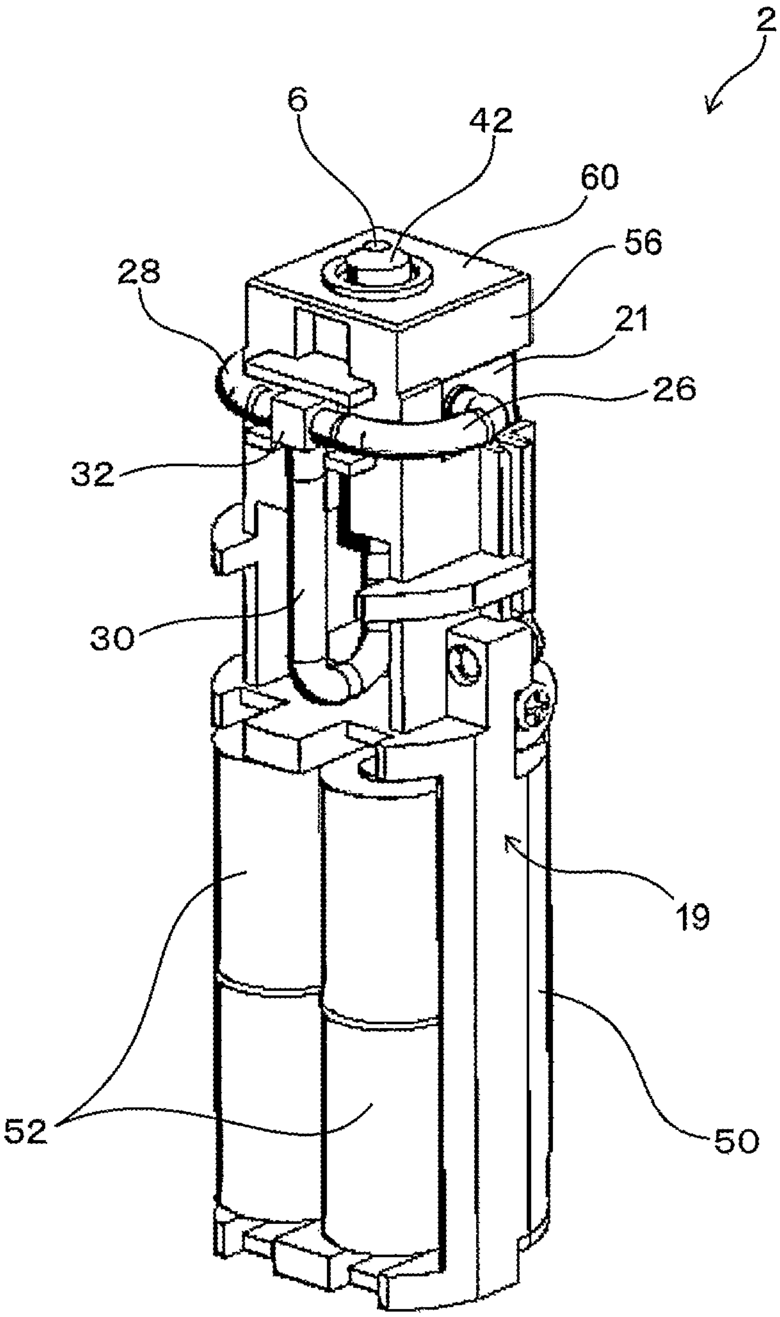
FIG. 8 is a perspective view on a rear side of the atomizer with the case removed, according to the embodiment.
Figure 9:
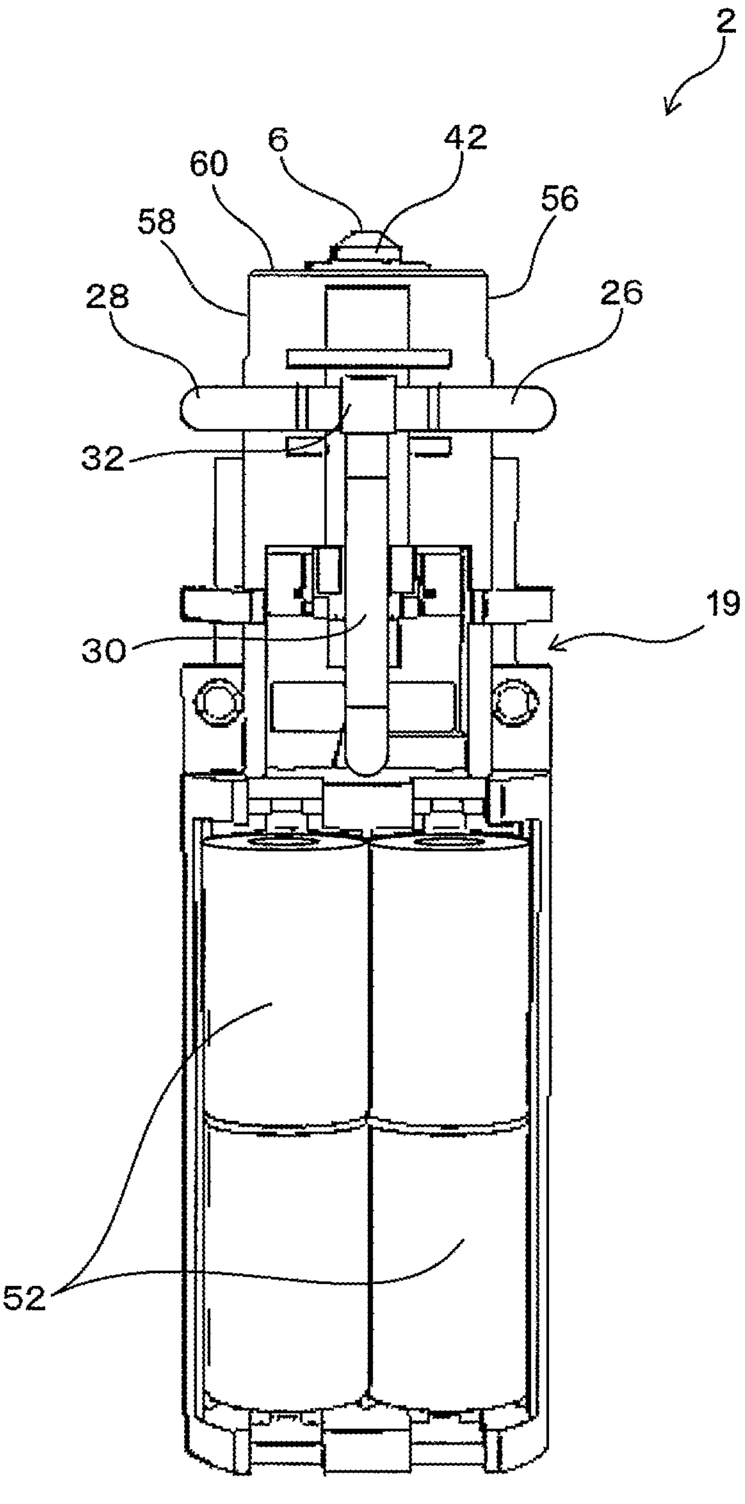
FIG. 9 is a rear view of the atomizer with the case removed, according to the embodiment.

In FIG. 8 and FIG. 9, figures on the opposite side to FIG. 5 and FIG. 6 are illustrated. FIG. 8 and FIG. 9 are a perspective view and a rear view, respectively, on the rear side of the atomizer 2 with the case 4 removed.

As illustrated in FIG. 8 and FIG. 9, the atomizer 2 includes a first flow path 26, a second flow path 28, a third flow path 30, a joint portion 32, and a battery 52.

The battery 52 is a member that supplies drive power to the first piezoelectric pump 21 and the second piezoelectric pump 22.

The first flow path 26 is a flow path connected to the first piezoelectric pump 21 described above. The second flow path 28 is a flow path connected to the second piezoelectric pump 22 described above. The first flow path 26 and the second flow path 28 of the present embodiment are arranged so as to be curved and extend on the same horizontal plane.

Figure 10:
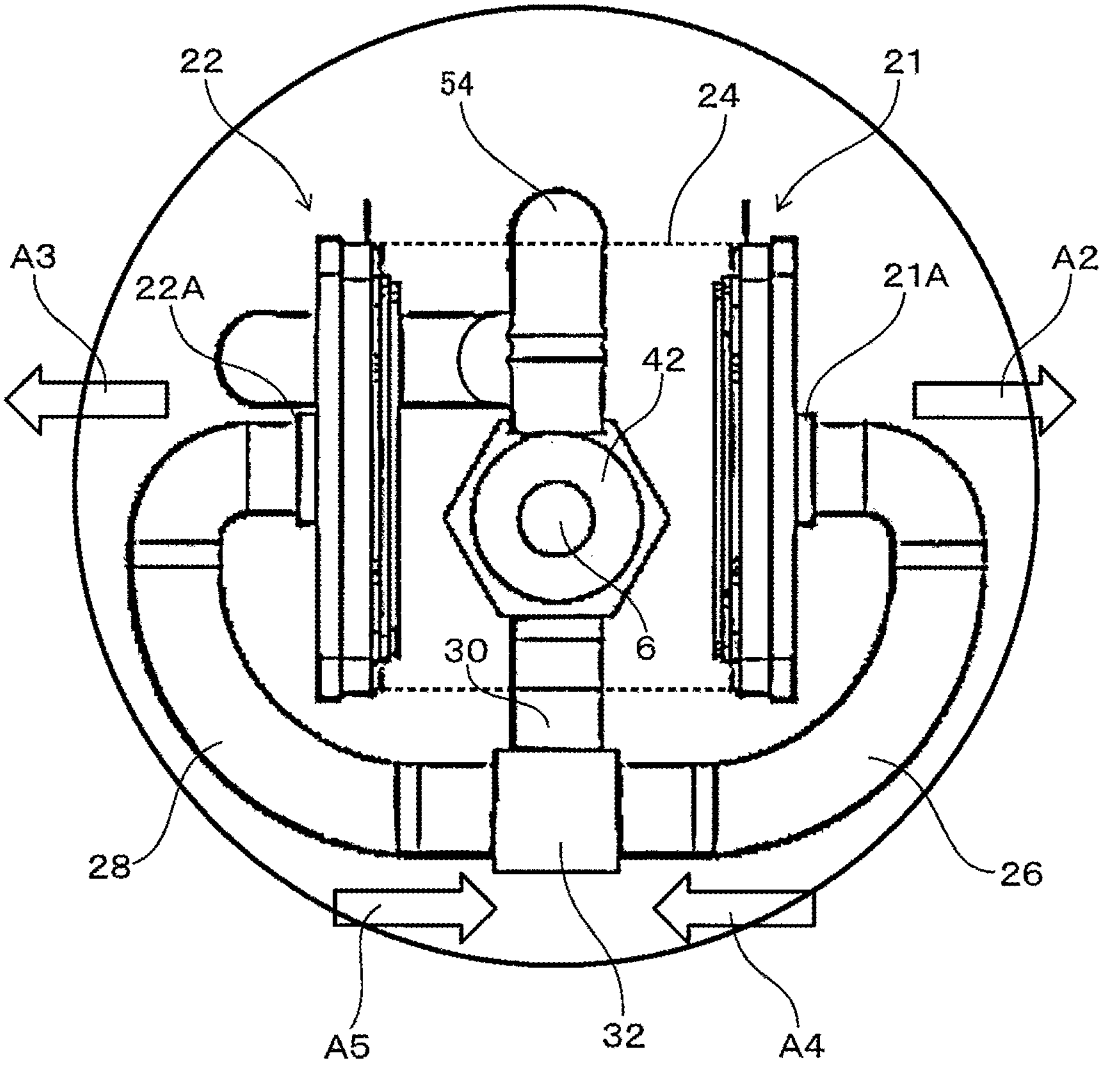
FIG. 10 is a top view of a first flow path and a second flow path, according to the embodiment.

FIG. 10 is a top view of the first flow path 26 and the second flow path 28. As illustrated in FIG. 10, one end of the first flow path 26 is connected to the first discharge port 21A of the first piezoelectric pump 21, and the other end of the first flow path 26 is connected to the joint portion 32. The first flow path 26 extends in the A2 direction from a position connected to the first discharge port 21A, and then is gently curved in a plan view. The first flow path 26 extends in an A4 direction at a position where the first flow path 26 is connected to the joint portion 32. The A2 direction and the A4 direction in the present embodiment are opposite to each other by 180 degrees.

Similarly, one end of the second flow path 28 is connected to the second discharge port 22A of the second piezoelectric pump 22, and the other end of the second flow path 28 is connected to the joint portion 32. The second flow path 28 extends in the A3 direction from a position connected to the second discharge port 22A, and then is gently curved in a plan view. The second flow path 28 extends in an A5 direction at a position where the second flow path 28 is connected to the joint portion 32. The A3 direction and the A5 direction in the present embodiment are opposite to each other by 180 degrees.

The A4 direction and the A5 direction in the present embodiment are opposite to each other by 180 degrees.

The joint portion 32 is a member that connects the first flow path 26, the second flow path 28, and the third flow path 30 to one another. The joint portion 32 corresponds to a merging portion that merges the first flow path 26 and the second flow path 28. By providing the joint portion 32, a plurality of flow paths can be easily connected.

Figure 11:
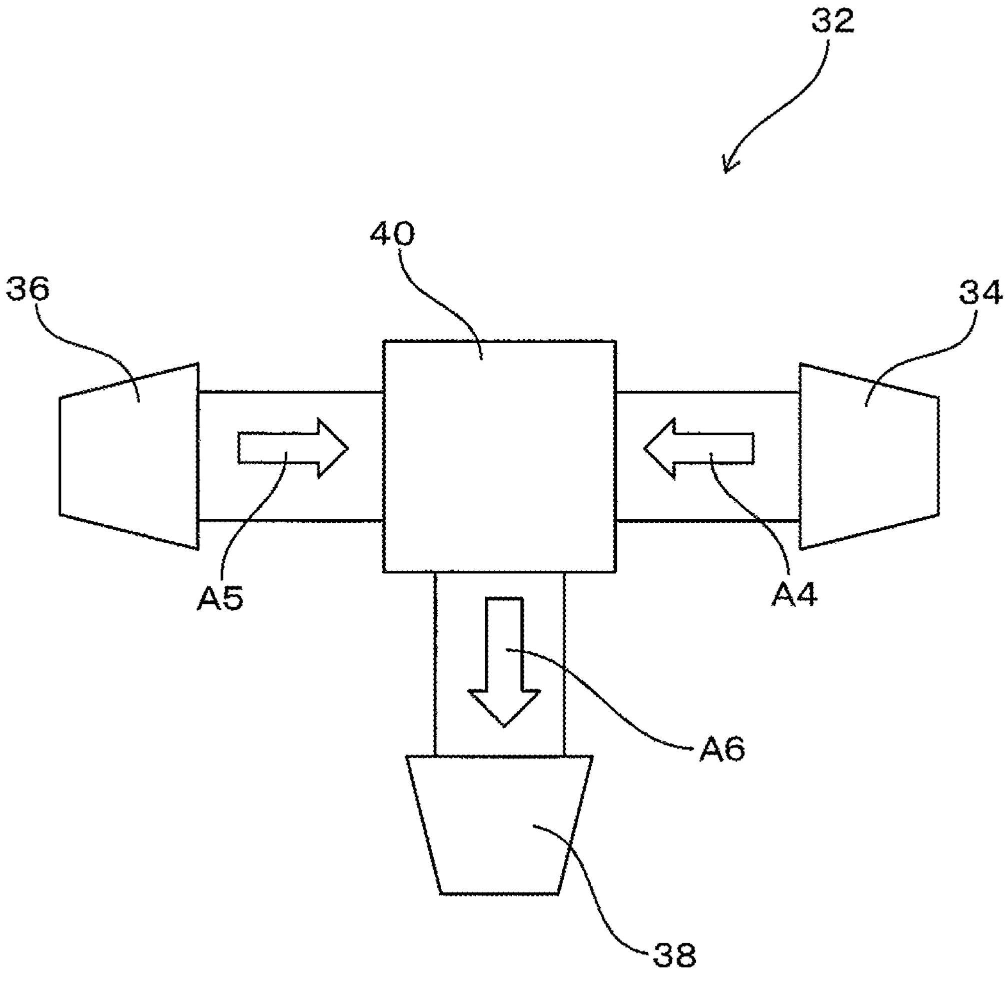
FIG. 11 is a front view of a joint portion, according to the embodiment.

FIG. 11 is an external view of the joint portion 32. The joint portion 32 illustrated in FIG. 11 has a first port 34, a second port 36, a third port 38, and a merging portion 40. The joint portion 32 illustrated in FIG. 11 is a so-called “T-tube”. Since the joint portion 32 is the T-tube, the joint portion 32 having versatility can be used, and manufacturing cost of the atomizer 2 can be reduced.

The first port 34 is a port connected to the first flow path 26 described above. Gas flows in the A4 direction in the first port 34. The second port 36 is a port connected to the second flow path 28 described above. Gas flows in the A5 direction in the second port 36. The gas flowing through the first port 34 in the A4 direction and the gas flowing through the second port 36 in the A5 direction are merged at the merging portion 40 and flow through the third port 38.

The gas flowing through the third port 38 travels toward the A6 direction. The A6 direction of the present embodiment is a direction orthogonal to the A4 direction and the A5 direction (downward in the present embodiment).

The third flow path 30 (FIG. 8 and FIG. 9) is connected to the third port 38. The third flow path 30 illustrated in FIG. 8 and FIG. 9 is a flow path connected from the joint portion 32 to the nozzle 42.

Figure 12:
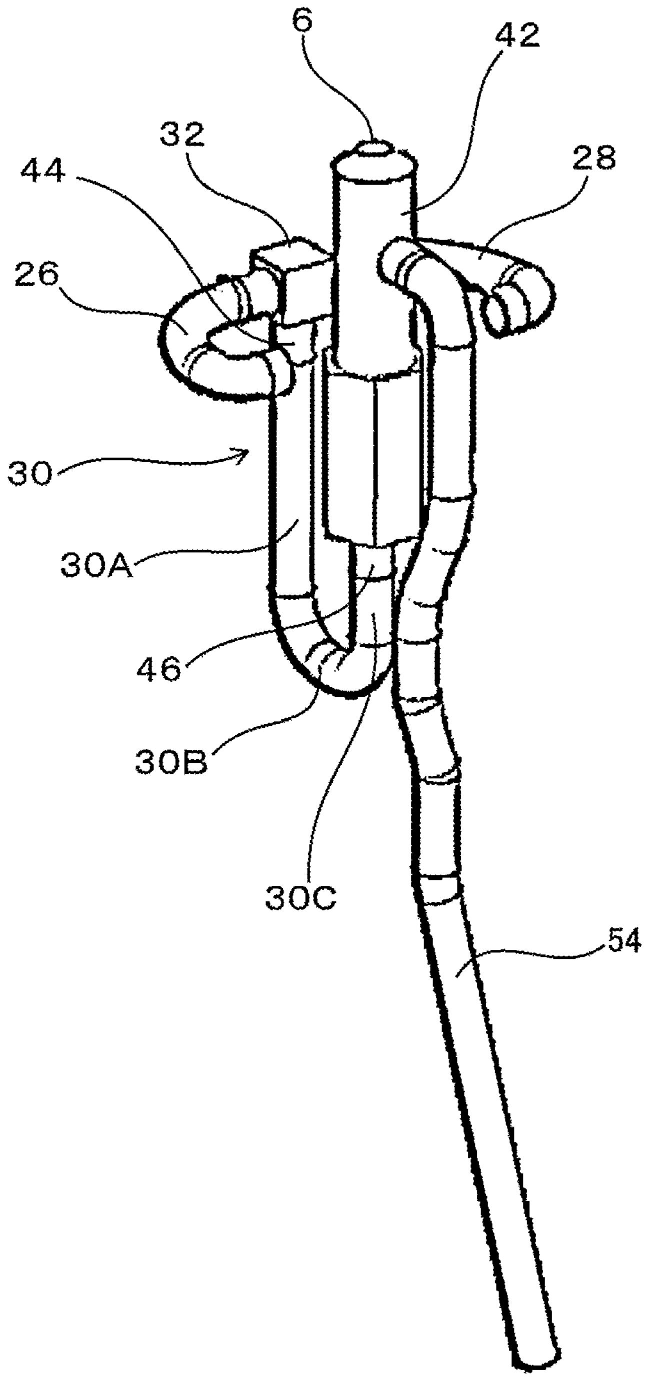
FIG. 12 is a perspective view illustrating a first flow path, a second flow path, a third flow path, a fourth flow path, and a nozzle according to the embodiment.
Figure 13:
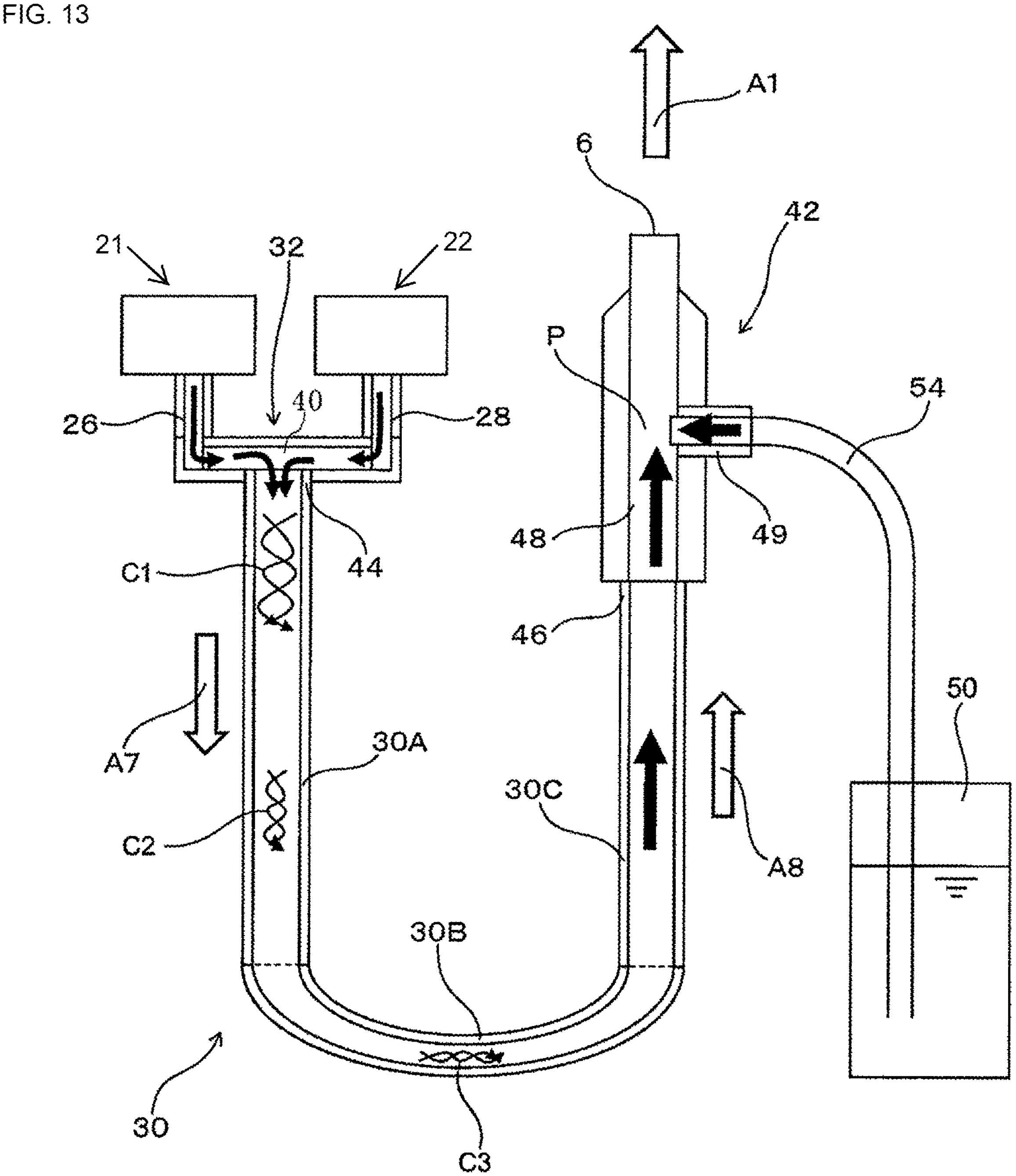
FIG. 13 is a schematic view illustrating the first flow path, the second flow path, the third flow path, the fourth flow path, and the nozzle, according the embodiment.

FIG. 12 and FIG. 13 are views illustrating the first flow path 26, the second flow path 28, the third flow path 30, the nozzle 42, and the like. FIG. 12 is a perspective view in which only the first flow path 26, the second flow path 28, the third flow path 30, the nozzle 42, and the fourth flow path 54 are extracted, and FIG. 13 is a schematic view including other configurations, in addition to these flow paths and nozzle. As illustrated in FIG. 12 and FIG. 13, the third flow path 30 has a bent portion bent from the joint portion 32 toward the nozzle 42. The third flow path 30 has a first end 44, and the first end 44 is connected to the joint portion 32. The third flow path 30 has a second end 46, and the second end 46 is connected to the nozzle 42.

The third flow path 30 has a first portion 30A, a second portion 30B, and a third portion 30C as a flow path extending from the first end 44 to the second end 46. As illustrated in FIG. 13, the first portion 30A linearly extends from the first end 44 in the A7 direction. The second portion 30B is a bent portion (curved portion) extending so as to be bent in a curved manner between the first portion 30A and the third portion 30C. The bent portion may be not only a curved portion in a curved manner but also a bent portion in a linear manner. The second portion 30B of the present embodiment is curved by 180 degrees. The third portion 30C is a portion linearly extending in the A8 direction from the second portion 30B to the second end 46.

Since the second portion 30B has a curved shape, the A7 direction in which the first portion 30A extends is different from the A8 direction in which the third portion 30C extends. The A7 direction and the A8 direction in the present embodiment are opposite to each other by 180 degrees.

The nozzle 42 to which the third flow path 30 is connected is a member configured to mix and atomize gas and liquid, and the liquid atomized by the nozzle 42 is blown out from the blow-out port 6. As illustrated in FIG. 12 and FIG. 13, the second portion 30B that is a bent portion is bent toward the opposite side (that is, the lower side) to the side (that is, the upper side) where the blow-out port 6 is positioned with respect to the merging portion 40.

The nozzle 42 includes a gas supply flow path 48 and a liquid supply flow path 49 in addition to the blow-out port 6. The gas supply flow path 48 is a flow path through which gas supplied from the third flow path 30 flows, and is connected to the second end 46 of the third flow path 30. The liquid supply flow path 49 is a flow path through which liquid supplied from the liquid storage portion 50 described above flows, and is connected to the liquid storage unit 50. The liquid supply flow path 49 is connected to the liquid storage portion 50 through the fourth flow path 54.

Inside the nozzle 42, the gas supply flow path 48 and the liquid supply flow path 49 are merged with each other, and the merging position is referred to as a merging point P. The gas supply flow path 48, the liquid supply flow path 49, and the blow-out port 6 are connected to one another so that the gas supplied to the gas supply flow path 48 and the liquid supplied to the liquid supply flow path 49 are merged at the merging point P and the merged gas and liquid are supplied to the blow-out port 6. An opening direction of an opening portion on a side of the liquid supply flow path 49 in the fourth flow path 54 intersects with an extending direction from the gas supply flow path 48 to the blow-out port 6.

Figure 14:
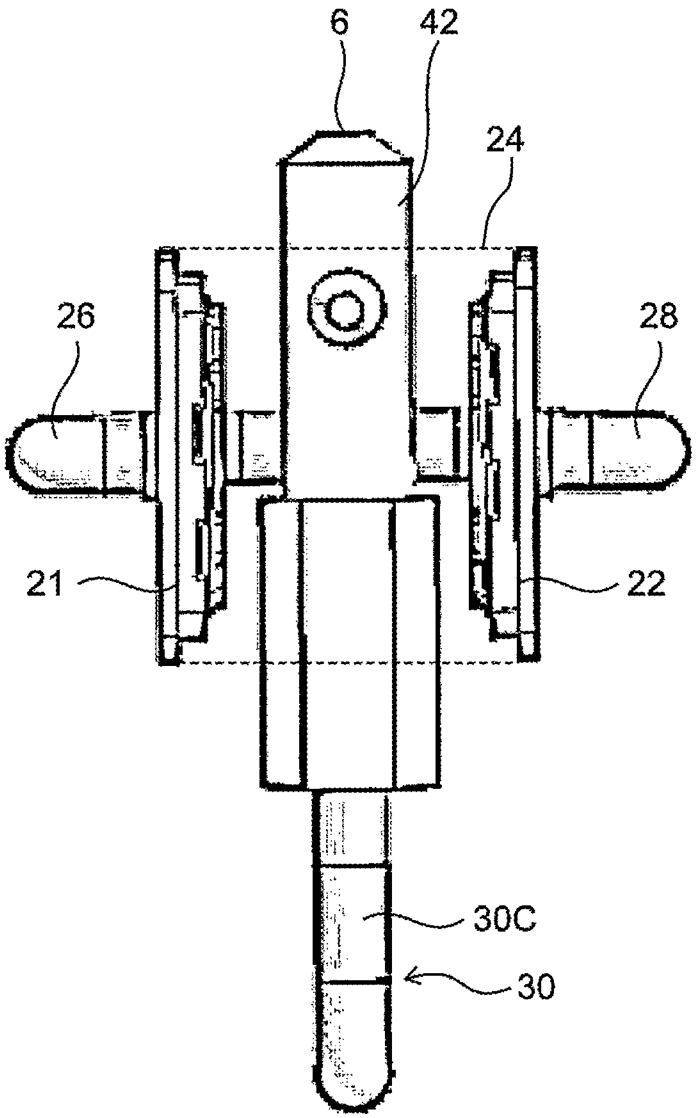
FIG. 14 is a front view illustrating a positional relationship between the nozzle and the piezoelectric pump, according to the embodiment.

The positional relationship between the nozzle 42 having the above-described configuration and the piezoelectric pumps 21 and 22 will be described with reference to FIG. 14. FIG. 14 is a front view illustrating the periphery of the nozzle 42 and the piezoelectric pumps 21 and 22. As illustrated in FIG. 14 and FIG. 10, the nozzle 42 is disposed in the space 24 between the first piezoelectric pump 21 and the second piezoelectric pump 22. By arranging the nozzle 42 having large dimensions between the piezoelectric pumps 21 and 22, efficient arrangement can be achieved, and the atomizer 2 can be miniaturized. In particular, the horizontal dimensions of the atomizer 2 can be reduced.

The operation of the atomizer 2 having the above-described configuration will be described. First, the user presses the switch 8. Thus, the first piezoelectric pump 21 and the second piezoelectric pump 22 are driven. The gas is blown out from the first piezoelectric pump 21 to the first flow path 26, and at the same time, the gas is blown out from the second piezoelectric pump 22 to the second flow path 28. In the present embodiment, the outputs of the first piezoelectric pump 21 and the second piezoelectric pump 22 are the same, and flow rates and flow velocities of the gas blown out from the discharge ports 21A and 22A are the same.

The gas flowing through the first flow path 26 and the gas flowing through the second flow path 28 are merged at the joint portion 32. As illustrated in FIG. 13, a turbulent flow may be generated by the gas being merged and colliding at the joint portion 32 (see arrows C1, C2, and C3). As described above, the third flow path 30 has a curved shape, and a total length of the third flow path 30 is longer than that in a case where, as in the document of the related art, a curved shape is not provided. Thus, a turbulent flow generated in the joint portion 32 is rectified as the turbulent flow proceeds through the third flow path 30. This makes it possible to supply gas having a more stable flow rate and flow velocity to the nozzle 42.

The gas supplied to the nozzle 42 flows through the gas supply flow path 48 and passes through the merging point P. Negative pressure is generated at the merging point P by passing gas having a predetermined flow rate and flow velocity through the merging point P, and a Venturi effect is generated. Due to the Venturi effect, the liquid in the liquid storage portion 50 is sucked to the merging point P through the fourth flow path 54. The liquid sucked to the merging point P is mixed with the gas flowing from the gas supply flow path 48 to be atomized. The atomized liquid is then blown out from the blow-out port 6 provided at the tip of the nozzle 42.

Here, the liquid sucked from the fourth flow path 54 toward the nozzle 42 may flow back toward the third flow path 30 on the opposite side to the blow-out port 6. On the other hand, in the present embodiment, the third flow path 30 is provided with the second portion 30B to have a curved shape. Due to this, even when the liquid flows back from the nozzle 42 to the third flow path 30, the liquid can be captured by the second portion 30B. Thus, it is possible to prevent the liquid from flowing back to the piezoelectric pumps 21 and 22 that are gas supply sources, and it is possible to suppress failure of the piezoelectric pumps 21 and 22 to improve reliability of the atomizer 2.

In addition, since the second portion 30B is bent toward the opposite side (that is, the lower side) to the side (that is, the upper side) on which the blow-out port 6 is positioned with respect to the merging portion 40, the liquid is easily captured by the second portion 30B.

As described above, the atomizer 2 of the present embodiment includes the first piezoelectric pump 21, the second piezoelectric pump 22, the first flow path 26, the second flow path 28, the third flow path 30, the nozzle 42, and the liquid storage portion 50. The first piezoelectric pump 21 is a piezoelectric pump that blows out gas from the first discharge port 21A, and the second piezoelectric pump 22 is a piezoelectric pump that blows out gas from the second discharge port 22A. The first flow path 26 is a flow path connected to the first discharge port 21A of the first piezoelectric pump 21, and the second flow path 28 is a flow path connected to the second discharge port 22A of the second piezoelectric pump 22 and merged with the first flow path 26. The third flow path 30 is a flow path having the first end 44 and the second end 46 that are connected to a position where the first flow path 26 and the second flow path 28 are merged. The nozzle 42 is a nozzle including the gas supply flow path 48 connected to the second end 46 of the third flow path 30, the liquid supply flow path 49, and the blow-out port 6, and the gas supply flow path 48 and the liquid supply flow path 49 are merged and connected to the blow-out port 6. In such a configuration, the third flow path 30 has the second portion 30B as a bent portion between the first end 44 and the second end 46.

According to such a configuration, by blowing out gas by using at least the two piezoelectric pumps 21 and 22, the flow rate per unit time blown out from the atomizer 2 can be increased, and the output performance of the atomizer 2 can be improved. Further, since the third flow path 30 has a bent shape, even when the liquid supplied to the nozzle 42 flows back to the third flow path 30, the liquid is captured in the third flow path 30 before reaching the first flow path 26 or the second flow path 28. As a result, it is possible to prevent the liquid supplied to the nozzle 42 from flowing back to the piezoelectric pumps 21 and 22, to suppress failure of the piezoelectric pumps 21 and 22, and to improve reliability of the atomizer 2.

Although the present disclosure has been described with reference to the above-described embodiment, the present disclosure is not limited to the above-described embodiment. For example, in the above-described embodiment, the case where two piezoelectric pumps of the first piezoelectric pump 21 and the second piezoelectric pump 22 are provided has been described, but the present disclosure is not limited to such a case, and three or more piezoelectric pumps may be provided.

Further, in the present embodiment, the case where the joint portion 32 is a T-tube has been described, but the present disclosure is not limited to such a case, and for example, a Y-tube or the like may be adopted.

Further, in the present embodiment, the case where the third flow path 30 has the first portion 30A having a linear shape, the second portion 30B having a curved shape, and the third portion 30C having a linear shape has been described, but the present disclosure is not limited to such a case. For example, the third flow path 30 may be partially or entirely bent such that the entire third flow path 30 is curved, the second portion 30B is linearly bent, or the like.

Figure 15:
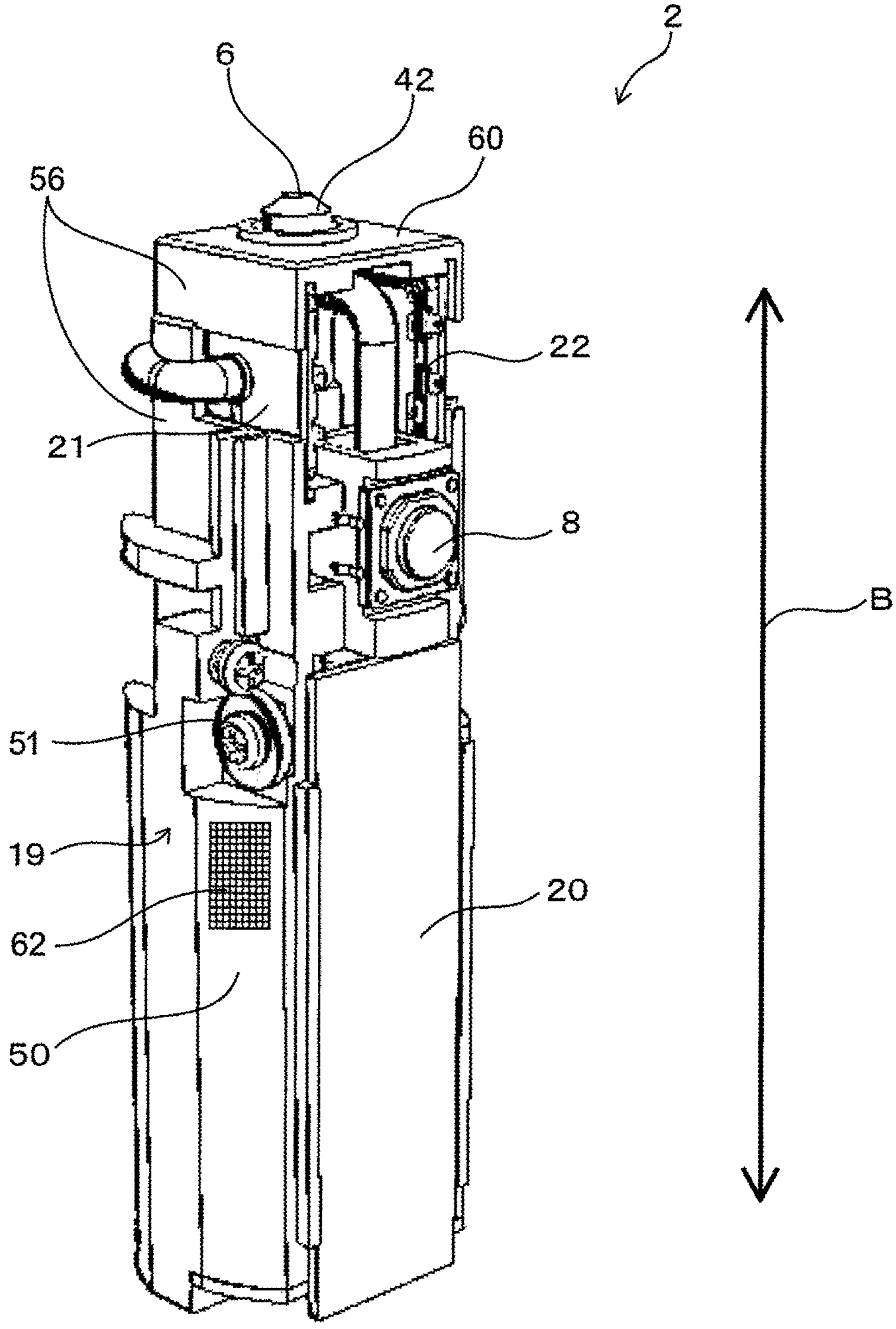
FIG. 15 is a perspective view on a front side of the atomizer with a case removed, according to a modified example.

Further, as illustrated in FIG. 15, the liquid storage portion 50 may be provided with a vent 62. The vent 62 is made of, for example, a material that allows only gas to pass therethrough without necessarily allowing liquid to pass therethrough. By providing the vent 62, the inside of the liquid storage portion 50 can be set to the atmospheric pressure, and stable and continuous atomization can be performed.

While the present disclosure has been fully described in connection with the embodiment thereof with reference to the accompanying drawings, it is to be noted that various changes and modifications will be apparent to those skilled in the art. It should be understood that such changes and modifications are included within the present disclosure without necessarily departing from the scope of the present disclosure as defined by the appended claims. In addition, changes in the combination or order of elements in each embodiment can be achieved without necessarily departing from the scope and spirit of the present disclosure.

INDUSTRIAL APPLICABILITY

The present disclosure is useful for atomizers for medical use, cosmetic use, and the like.

REFERENCE SIGNS LIST

2 ATOMIZER
4 CASE
4A FIRST CASE PORTION
4B SECOND CASE PORTION
6 BLOW-OUT PORT
8 SWITCH
10 UPPER SURFACE
12 LOWER SURFACE
14 SIDE SURFACE
16 FIRST OPENING
18 SECOND OPENING
19 HOUSING
20 CONTROL BOARD
21 FIRST PIEZOELECTRIC PUMP
21A FIRST DISCHARGE PORT
21B FIRST MAIN SURFACE
21C SECOND MAIN SURFACE
22 SECOND PIEZOELECTRIC PUMP
22A SECOND DISCHARGE PORT
22B THIRD MAIN SURFACE
22C FOURTH MAIN SURFACE
24 SPACE
26 FIRST FLOW PATH
28 SECOND FLOW PATH
30 THIRD FLOW PATH
30A FIRST PORTION
30B SECOND PORTION (BENT PORTION, CURVED PORTION)
30C THIRD PORTION
32 JOINT PORTION
34 FIRST PORT
36 SECOND PORT
38 THIRD PORT
40 MERGING PORTION
42 NOZZLE
44 FIRST END
45 SCREW
46 SECOND END
48 GAS SUPPLY FLOW PATH
49 LIQUID SUPPLY FLOW PATH
50 LIQUID STORAGE PORTION
51 WATER SUPPLY HOLE
52 BATTERY
54 FOURTH FLOW PATH
56 SIDE WALL PORTION
58 SIDE WALL PORTION
60 UPPER WALL PORTION
62 VENT
P MERGING POINT

The invention claimed is:

1. An atomizer comprising:
a first piezoelectric pump configured to blow out gas from a first discharge port;
a second piezoelectric pump configured to blow out gas from a second discharge port;
a first flow path connected to the first discharge port of the first piezoelectric pump;
a second flow path connected to the second discharge port of the second piezoelectric pump and merged with the first flow path;
a third flow path connected to a merging portion of the first flow path and the second flow path, the third flow path having a first end and a second end;
a liquid storage portion configured to store liquid;
a nozzle including a gas supply flow path connected to the second end of the third flow path, a liquid supply flow path connected to the liquid storage portion, and a blow-out port, the blow-out port connected to the gas supply flow path and the liquid supply flow path in such a manner that gas supplied to the gas supply flow path and liquid supplied to the liquid supply flow path are merged to supply the merged gas and liquid to the blow-out port, wherein the third flow path has a bent portion between the first end and the second end.

2. The atomizer according to claim 1, wherein the bent portion is bent toward a direction opposite to a direction where the blow-out port is positioned with respect to the merging portion.

3. The atomizer according to claim 2, wherein the third flow path includes a first portion extending from the first end, a second portion being curved and extending from the first portion as the bent portion, and a third portion extending from the second portion to the second end.

4. The atomizer according to claim 2, wherein the first piezoelectric pump has a first main surface comprising the first discharge port and a second main surface opposite to the first main surface, the second piezoelectric pump has a third main surface comprising the second discharge port and a fourth main surface opposite to the third main surface, and the second main surface and the fourth main surface are arranged to face each other.

5. The atomizer according to claim 2, wherein the atomizer further comprises a joint portion that have a first port, a second port, and a third port respectively connected to the first flow path, the second flow path, and the third flow path, and the merging portion of the first flow path and the second flow path has a flow path inside the joint portion.

6. The atomizer according to claim 1, wherein the third flow path includes a first portion extending from the first end, a second portion being curved and extending from the first portion as the bent portion, and a third portion extending from the second portion to the second end.

7. The atomizer according to claim 6, wherein the first piezoelectric pump has a first main surface comprising the first discharge port and a second main surface opposite to the first main surface, the second piezoelectric pump has a third main surface comprising the second discharge port and a fourth main surface opposite to the third main surface, and the second main surface and the fourth main surface are arranged to face each other.

8. The atomizer according to claim 6, wherein the atomizer further comprises a joint portion that have a first port, a second port, and a third port respectively connected to the first flow path, the second flow path, and the third flow path, and the merging portion of the first flow path and the second flow path has a flow path inside the joint portion.

9. The atomizer according to claim 1, wherein the first piezoelectric pump has a first main surface comprising the first discharge port and a second main surface opposite to the first main surface, the second piezoelectric pump has a third main surface comprising the second discharge port and a fourth main surface opposite to the third main surface, and the second main surface and the fourth main surface are arranged to face each other.

10. The atomizer according to claim 9, wherein the nozzle is arranged in a space between the second main surface and the fourth main surface.

11. The atomizer according to claim 1, wherein the atomizer further comprises a joint portion that have a first port, a second port, and a third port respectively connected to the first flow path, the second flow path, and the third flow path, and a flow path is inside the joint portion at the merging portion of the first flow path and the second flow path.

12. The atomizer according to claim 11, wherein the joint portion is a T-tube or a Y-tube.

13. The atomizer according to claim 1, further comprising:

a case configured to accommodate the first piezoelectric pump, the second piezoelectric pump, the first flow path, the second flow path, the third flow path, and the nozzle, the case comprising a first opening through which the blow-out port of the nozzle is exposed to an outside.

14. The atomizer according to claim 13, further comprising:

a switch electrically connected to the first piezoelectric pump and the second piezoelectric pump, wherein the case accommodates the switch and comprises a second opening through which the switch is exposed to an outside.

15. The atomizer according to claim 14, wherein the case has an upper surface, a lower surface, and a side surface connecting the upper surface and the lower surface, the upper surface comprises the first opening, and the side surface comprises the second opening.

16. The atomizer according to claim 15, wherein the second opening is arranged at a position closer to the upper surface than to the lower surface in the side surface of the case.

17. The atomizer according to claim 13, wherein the case has an upper surface, a lower surface, and a side surface connecting the upper surface and the lower surface, and the upper surface comprises the first opening.

18. The atomizer according to claim 13, wherein the case has a cylindrical shape.

19. The atomizer according to claim 1, wherein the liquid storage portion includes a vent.

20. An atomizer comprising:

a first piezoelectric pump configured to blow out gas from a first discharge port;

a second piezoelectric pump configured to blow out gas from a second discharge port;

a first flow path connected to the first discharge port of the first piezoelectric pump;

a second flow path connected to the second discharge port of the second piezoelectric pump and merged with the first flow path;

a third flow path connected to a merging portion of the first flow path and the second flow path, the third flow path having a first end and a second end;

a liquid storage portion configured to store liquid;

a nozzle including a gas supply flow path connected to the second end of the third flow path, a liquid supply flow path connected to the liquid storage portion, and a blow-out port, the blow-out port connected to the gas supply flow path and the liquid supply flow path in such a manner that gas supplied to the gas supply flow path and liquid supplied to the liquid supply flow path are merged to supply the merged gas and liquid to the blow-out port; and a fourth flow path provided between the liquid storage portion and the liquid supply flow path, wherein the third flow path includes a first portion including the first end, a third portion including the second end, and a second portion provided between the first portion and the third portion, the second portion positioned below the first portion and the third portion, the second portion including a bent portion, and an opening direction of an opening portion on a side of the liquid supply flow path in the fourth flow path intersects with an extending direction from the gas supply flow path to the blow-out port.

* * * * *